US005747894A

United States Patent [19]

Hirai et al.

[11] Patent Number: 5,747,894

[45] Date of Patent: May 5, 1998

[54] FACTORY AUTOMATION CONNECTOR AND WORK PALLET

[75] Inventors: Junji Hirai; Yoshiji Hiraga; Kenji Nomura, all of Kitakyushu, Japan

[73] Assignee: Kabushiki Kaisha Yaskawa Denki, Kitakyushu, Japan

[21] Appl. No.: 704,543

[22] PCT Filed: Mar. 9, 1995

[86] PCT No.: PCT/JP95/00392

§ 371 Date: Sep. 11, 1996

§ 102(e) Date: Sep. 11, 1996

[87] PCT Pub. No.: WO95/24722

PCT Pub. Date: Sep. 14, 1995

[30] Foreign Application Priority Data

Mar. 11, 1994 [JP] Japan .................................... 6-067749

[51] Int. Cl.$^6$ ..................................................... B23Q 3/155

[52] U.S. Cl. ...................... 307/104; 307/17; 336/DIG. 3; 29/592.1; 363/95

[58] Field of Search ............... 307/104, 17; 336/DIG. 3, 336/200; 29/568; 363/95; 4/541.3

[56] References Cited

U.S. PATENT DOCUMENTS

| | | | |
|---|---|---|---|
| 3,707,686 | 12/1972 | Uekusa | 331/65 |
| 4,809,426 | 3/1989 | Takeuchi | 29/568 |
| 4,837,556 | 6/1989 | Matsushita et al. | |
| 4,855,982 | 8/1989 | Orlicki | 369/44 |
| 5,412,253 | 5/1995 | Hough | 307/17 |
| 5,422,519 | 6/1995 | Russell | 307/104 |

FOREIGN PATENT DOCUMENTS 0 374 016 6/1990 European Pat. Off. .

*Primary Examiner*—William M. Shoop, Jr.
*Assistant Examiner*—Peter Ganjian
*Attorney, Agent, or Firm*—Oblon, Spivak, McClelland, Maier & Neustadt, P.C.

[57] ABSTRACT

A connector divice which can stably supply electric power and send and receive signals in a contactless way, i.e., without using any electrode contact, and without strict alignment of the device. The connector divice is equipped with a primary-side coupler having a fluid coupler which couples two fluid pipes with each other, an electromagnetic coupler in which an electric signal transmitting section and an electric power feeding section are coaxially arranged, with the former inside and the latter outside, and which supplies electric signals and electric power to a secondary-side coupler in a contactless way by utilizing high-frequency electromagnetic induction, and a high-frequency inverter which generate electric power supplied to the secondary-side, and secondary-side coupler having a fluid coupler which couples two fluid pipes with each other, an electromagnetic coupler in which an electric signal receiving section and an electric power receiving section are coaxially arranged, with the former inside and the latter outside, and which receives electric signals and electric power from the primary-side coupler in a contactless way by utilizing high-frequency electromagnetic induction, and a converting section which converts the electric signals and electric power received for the load driven on the secondary side.

3 Claims, 3 Drawing Sheets

FACTORY AUTOMATION CONNECTOR AND WORK PALLET

BACKGROUND OF THE INVENTION

1. Field of the Invention

This invention relates to a Factory Automation (FA) connector for contactless transmission of electric power and signals which minimizes, in a machine tool working preparation system wherein a clamping or chucking operation of an object work is performed not manually but automatically using a fluid pressure such as a hydraulic pressure or a pneumatic pressure on a rotary member such as a circular table or a body which separately moves such as a work pallet for a machining center, the numbers of automatic couplings and external pipes for supply of fluid and allows fully automated remote control of solenoid valves.

2. Discussion of Background

Although operations of a so-called preparation step wherein an object work is clamped or chucked on a rotary member such as a circular table or an autonomous movable body such as a work pallet for a machining center prior to machining have been conventionally relying much upon the manpower, as the working time decreases, the ratio of the preparation time occupying in the total process time is gradually increasing. Further, shortage of the manpower and transition to a production method of many kinds by small quantities in recent years further increase the necessity for full automation of the preparation step.

In this connection, a connector (coupler) for automatically connecting or disconnecting a hydraulic pressure or a pneumatic pressure has been recently developed, and this facilitates supply of power for clamping or chucking a work on a rotary member or an autonomous movable body. In a situation in which it is forecast that loading and unloading of a work will be performed by a robot in the future, a demand to automate all of centering, positioning, clamping and unclamping operations of a work is increasing. Although the automatic connector described above has made it possible to supply fluid (particularly a hydraulic pressure) as pressure sources for performing such operations, transmission of signals for controlling the pressure sources by means of solenoid valves to drive actuators on a rotary member or a separate movable body must be performed solving the problem of bad circumferential environment of presence of oil water and swarf.

Generally, a work clamp on a rotary table or a movable pallet in almost all cases includes a plurality of hydraulic (or pneumatic) actuators which operate independently of each other for one work and besides includes a plurality of works. As the number of actuators involved increases in this manner, also the number of automatic couplings and the number of pipes on the fixed side increase. An increase of the number of automatic couplings not only makes positioning for fitting difficult but also results in increase of the size of the coupling section and in deterioration of the reliability, and an increase in number of pipes gives rise to a problem in regard to an equipment arrangement.

Accordingly, in order to eliminate these drawbakcs, the number of fluid supply paths between the rotary member or movable body and the fixed section must be minimized by mounting a plurality of solenoid valves for controlling the individual actuators independently of each other on the rotary member or movable body. In this instance, the point is how signals are communicated with power supplies for driving those solenoid valves.

One of candidates which allows this is a conventional multiple contact type connector. However, in environment of a working site of a machine tool to which the present invention is directed, the conventional multiple contact type connector does not allow stable power supply, signal transmission and control for a long period of time because of presence of oil for generation of a hydraulic pressure, cutting oil, water, swarf and so forth.

Meanwhile, a contact type power feeder apparatus which is formed integrally with a manifold in which hydraulic pipes are arranged is disclosed in Japanese Patent Laid-open Application No. 290113/87. While this apparatus is constructed such that hydraulic pipes are joined together by a magnetic attracting force which is generated when power is supplied, it is dangerous in bad environment since it is of the contact type. Further, since a valve of a hydraulic apparatus must be operated on the fixed side (primary side), an autonomous operation of the movable side (secondary side) is impossible.

Further, although Japanese Patent Laid-open Application No. 6993/94 proposed previously by the present applicant discloses details of a contactless feeder apparatus itself, it does not disclose an apparatus formed integrally with a coupling apparatus for fluid pipes.

SUMMARY OF THE INVENTION

Accordingly, it is an object of the present invention to provide a connector device which allows stable supply power and signal communication in a contactless way without using electrode contacts and besides without the necessity for strict alignment.

According to the present invention, there is provided an FA connector for transmitting electric power, electric signals and fluid between a primary side and a secondary side, comprising:

a primary side coupler including a fluid coupler for coupling two fluid pipes, an electromagnetic coupler including an electric signal transmitting section arranged on the inner side and an electric power feeding section arranged on the outer side coaxially with the electric signal transmitting section for transmitting electric signals and electric power, respectively, in a contactless way to a secondary side coupler by high frequency electromagnetic induction, and a high frequency invertor for generating electric power to be transmitted to the secondary side; and a secondary side coupler including a fluid coupler for coupling two fluid pipes, an electromagnetic coupler including an electric signal receiving section arranged on the inner side and an electric power receiving section arranged on the outer side coaxially with the electric signal receiving section for receiving electric signals and electric power, respectively, in a contactless way from the primary side coupler, and a conversion section for converting the electric signals and the electric power transmitted from the primary side to the secondary side into electric signals and electric power for a load to be driven on the secondary side.

In the present invention, in order to control a plurality of solenoid valves on a rotary member (for example, a multiple rotation circular table) or a movable body (a work pallet for a machining center) for which wiring of a cable is difficult or impossible, stably without being influenced by bad environment (presence of oil, cutting oil, water, swarf or the like), electric power can be transmitted from the primary side, that is, the fixed side, by high frequency electromagnetic induction without electrode contacts and also signal communication is performed in a contactless way. On the secondary side (that is, on the rotary or movable side), high frequency electric power is rectified, smoothed and stabilized to produce a solenoid valve driving power supply, a sensor power supply, and a CPU circuit control power supply. Transmission of on/off control signals for the solenoid valves is performed by serial communication via a high frequency split transformer of a small size which forms a magnetic path different from that of a split transformer for transmission of electric power, and a CPU mounted on the secondary side sequentially provides signals to solenoid driving elements to control the plurality of solenoid valves.

Consequently, it is to be noted that only two fluid paths are required whatever the arrangement of the fluid pipes of the connector may be.

Further, contact information of the hydraulic and pneumatic apparatus mounted on the secondary side is transmitted by serial transmission by high frequency electromagnetic induction reversely from the secondary side to the primary side. In addition, also analog instruction signals necessary for controlling servo valves and so forth and analog feedback signals such as detection values of the clamping forces or chucking forces are transmitted from the primary side to the secondary side or from the secondary side to the primary side by the same serial communication.

As described above, where the FA connector of the present invention is employed, even if clamping of a work by a fluid pressure (hydraulic pressure or pneumatic pressure) on a rotary table or a movable pallet is performed using a plurality of actuators or a plurality of works are to be clamped, control can be performed without increasing the number of automatic fluid couplings or the number of pipes on the fixed side, and as a result, the problems of increase of the size and deterioration of the reliability of the coupling section and increase of the size of a pipe equipment can be eliminated. Besides, different from conventional connectors wherein a multiple contact connector or a slip ring set is employed, the FA connector does not suffer from deterioration by bad environment at a working site of the machine tool (that is, presence of oil for generation of a hydraulic pressure, cutting oil, water, swarf or the like) and allows stable power supply and control for a long period of time. Besides, (particularly in the case of the separately movable body), the effect that strict alignment for fitting need not be performed is obtained. Consequently, the FA connector contributes very much to realization of full automation of the preparation process prior to the working process by a machine tool.

DETAILED DESCRIPTION OF THE PREFERRED EMBODIMENT

Figure 1:
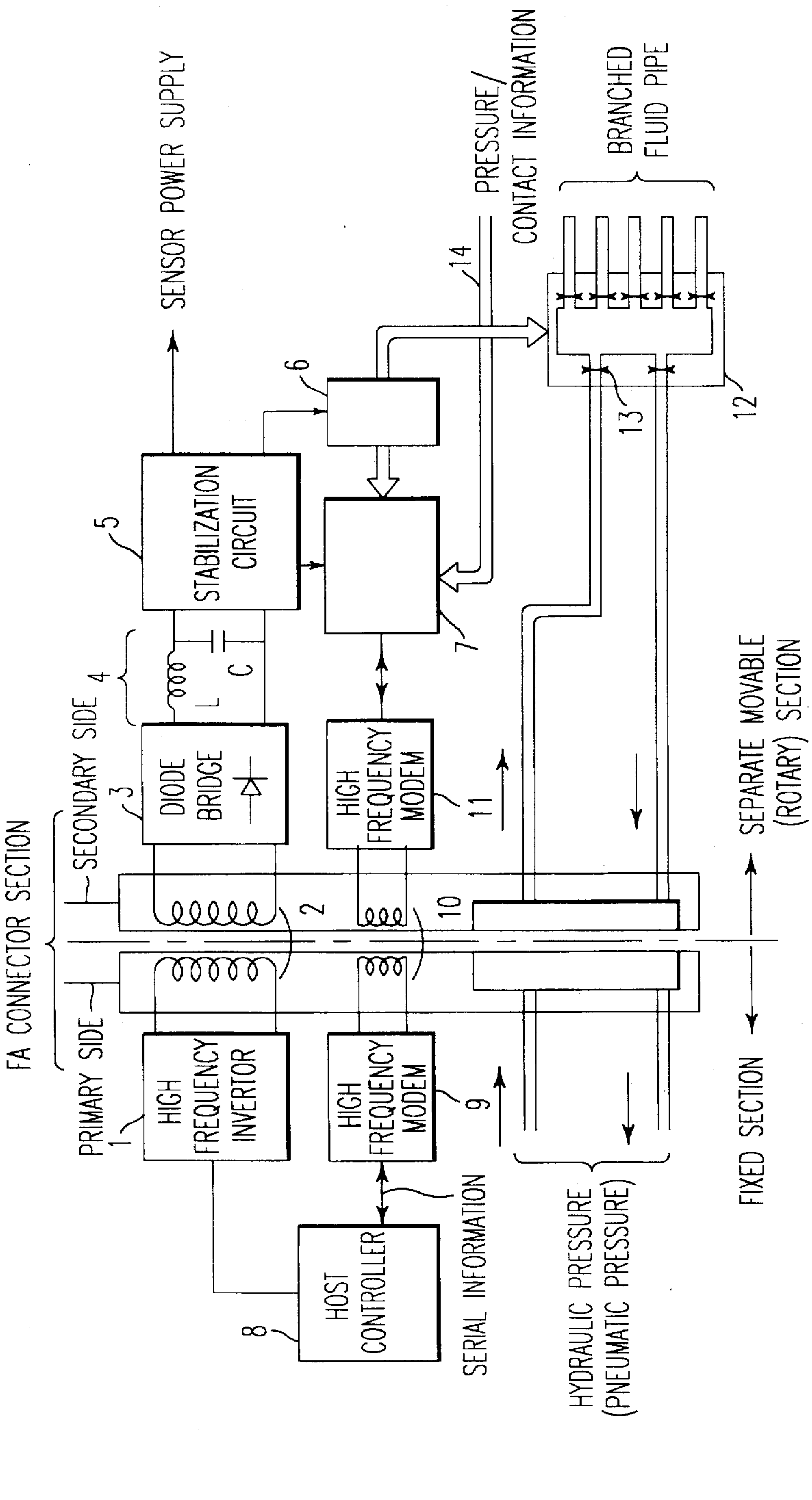
FIG. 1 is a view showing a concept block diagram of the present invention.

FIG. 1 shows a construction of an FA connector according to the present invention.

Figure 2:
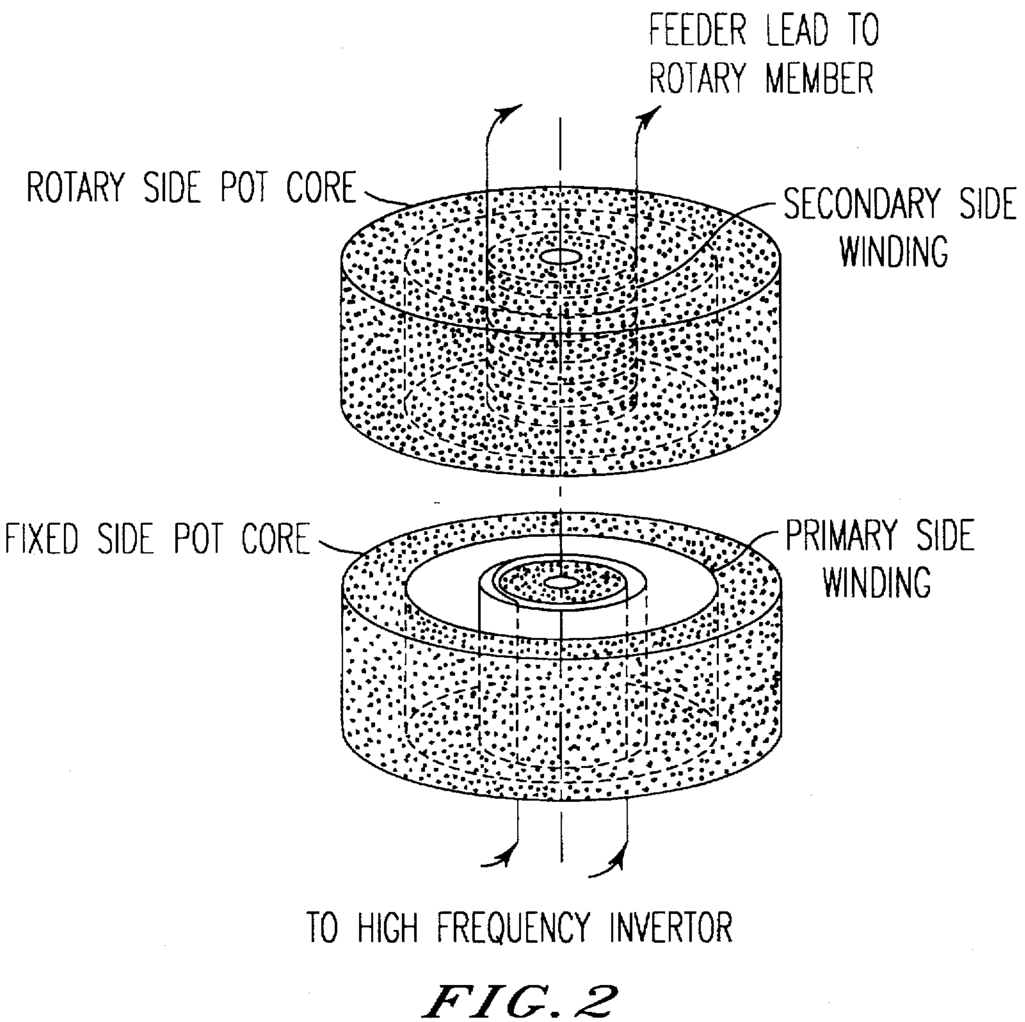
FIG. 2 is a view showing an electromagnetic coupling.

High frequency invertor 1 is provided on the primary side (fixed side) and generates a sine-wave or rectangular wave high frequency voltage higher than 10 kHz. The high frequency voltage is applied to the primary side of high frequency split transformer 2 as shown in FIG. 2. The secondary side of high frequency split transformer 2 is mounted on a rotary member or separate movable body side and is opposed to the primary side in a contactless way across a narrow gap left therebetween. In mounting on the rotary member, where power supply and signal communication must always be performed, a split transformer in the form of a pot is arranged concentrically with a rotary shaft in such a manner as shown in FIG. 2 so as to establish electromagnetic coupling irrespective of the angle of rotation.

In this manner, a high frequency voltage is generated in the secondary winding arranged close to the primary side (fixed side) with the narrow gap left therebetween, and this voltage is rectified and smoothed by diode bridge 3 and LC filter 4 mounted on the rotary member or movable body so that it is converted into a dc voltage. Then, the dc voltage is stabilized by stabilization circuit 5 and serves as power supply to solenoid valve control circuit 6, sensors not shown and parallel-serial conversion circuit 7.

Meanwhile, transmission of on/off signals for solenoid valves is performed by serial communication by high frequency electromagnetic induction by means of split transformer 10 of a small size which forms a magnetic path separately from high frequency split transformer 2 for power transmission after serial information from host controller 8 is modulated into a high frequency signal by high frequency modem 9. The modulated high frequency signal is received by the secondary side (rotary or movable side) and demodulated by high frequency modem 11 mounted on the secondary side, whereafter it is inputted in the form of serial data to parallel-serial conversion circuit 7. Parallel-serial conversion circuit 7 has also an operation processing function and sequentially provides signals to solenoid valve control circuit 6 to control a plurality of solenoid valves 13 of fluid branching section 12. Further, pressure or contact information 14 of a plurality of hydraulic or pneumatic sensor apparatus mounted on the secondary side is fetched conversely to parallel-serial conversion circuit 7 and is fed back by serial transmission from the secondary side to the primary side similarly by high frequency electromagnetic induction.

Further, also analog instruction signals necessary for controlling hydraulic and/or pneumatic servo valves and analog feedback signals such as detection values of clamping forces and chucking forces are transmitted from the primary side to the secondary side or from the secondary side to the primary side by the same serial communication.

Figure 3:
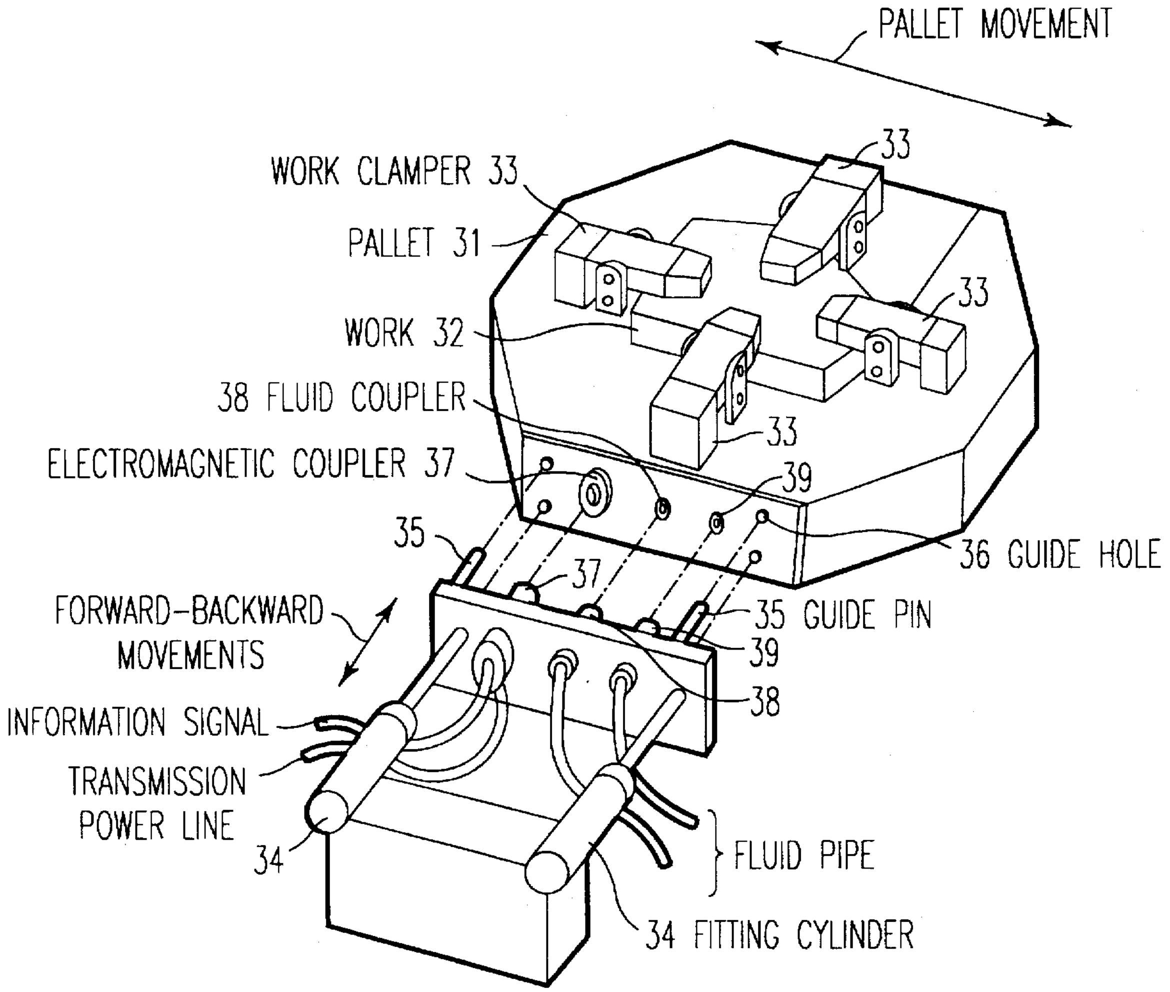
FIG. 3 is a view showing an example of a concrete application of the present invention.

FIG. 3 shows an example wherein the present invention is applied to a pallet. Pallet 31 has a built-in secondary side circuit of an FA connector of the present invention built therein and has work dampers 33 for fixing work 32 using a hydraulic pressure of the secondary side circuit. A primary side circuit of the FA connector of the present invention is attached to an end of each of fitting cylinders 34 such that electromagnetic coupler 37 and fluid couplers 38 and 39 are coupled between the primary side and the secondary side by fitting guide pins 35 into guide holes 36. However, the electromagnetic coupler feeds power in a contactless way while it keeps an electrically isolated condition. This eliminates the possibility that an electric spark may be produced.

Electromagnetic coupler 37 includes a coaxial arrangement of split transformers 2 and 10 for electric power and electric signals, respectively.

Where each of work dampers 33 which fix works using fluid pressures is hydraulically controlled, there is no problem in using a hydraulic pressure to fix a work because a pressure keeping function can be achieved readily using a check valve or a like element, but where each of work dampers 33 is pneumatically controlled, consideration is needed because, different from a hydraulic pressure, it is difficult to keep a pressure by pneumatic control. For example, it is recommended to adopt a countermeasure wherein springs are provided such that, when work dampers 33 are not connected to air sources (upon movement or working), a work is clamped to the pallet by the force of the springs, and the clamp is cancelled by a pneumatic pressure (clamp arms are moved up or down against the spring force by pneumatic control of a plurality of solenoid valves).

Further, if a CPU is mounted on the secondary side (on the rotary member or separate movable body) and serial communication is performed, then the number of couplings for signals can be reduced remarkably and the number of informations such as seating of a mounted and fixed work and feedback of sensor signals for confirmation of clamping forces can be increased. Besides, where the CPU is provided on the movable body, also communication of IDs of a work and the pallet and working information can be performed by a backing up memory.

Further, the connector according to the present invention is effective not only for machine tools, but also for control of a plurality of hydraulic or pneumatic actuators attached to an end of a robot arm. Particularly where a plurality of air supply and discharge paths are involved like a pneumatically driven tool exchange of the turret type, a connector of the rotary type is effective.

INDUSTRIAL APPLICABILITY

The present invention is available for a work pallet used for a machine tool or a like machine and peripheral apparatus of the work pallet.

We claim:

1. An FA connector for transmitting electric power, electric signals and fluid between a primary side and a secondary side, comprising:

a primary side coupler including a fluid coupler for coupling two fluid pipes, an electromagnetic coupler including an electric signal transmitting section arranged on the inner side and an electric power feeding section arranged on the outer side coaxially with said electric signal transmitting section for transmitting electric signals and electric power, respectively, in a contactless way to a secondary side coupler by high frequency electromagnetic induction, and a high frequency invertor for generating electric power to be transmitted to the secondary side; and a secondary side coupler including a fluid coupler for coupling two fluid pipes, an electromagnetic coupler including an electric signal receiving section arranged on the inner side and an electric power receiving section arranged on the outer side coaxially with said electric signal receiving section for receiving electric signals and electric power in a contactless way from said primary side coupler, and a conversion section for converting the electric signals and the electric power transmitted from the primary side to the secondary side into electric signals and electric power for a load to be driven on the secondary side.

2. A Factory Automation connector as set forth in claim 1, characterized in that said load includes a plurality of solenoid valves for distributing fluid into a plurality of pipes.

3. A work pallet, comprising a secondary side coupler of a Factory Automation connector according to claim 2, said work pallet operating a plurality of clamps by a fluid pressure.

* * * * *